July 29, 1969 G. P. DENGER 3,458,770
LIGHT INTEGRATING CIRCUIT WITH CURRENT PRODUCING PHOTOSENSITIVE CELL IN THE BRIDGE CIRCUIT
Filed June 14, 1966
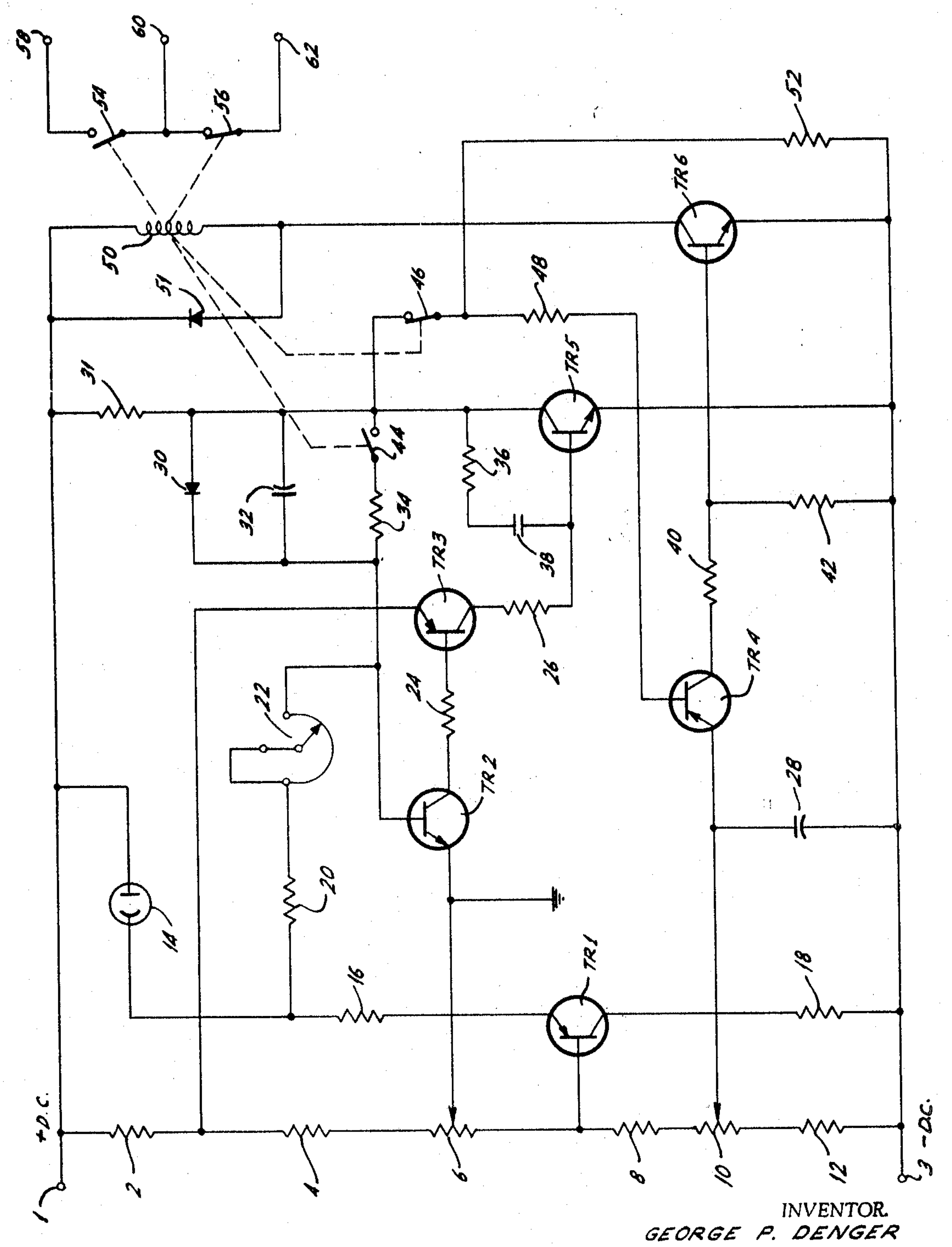
INVENTOR.
GEORGE P. DENGER
BY
Bilker, Kimmelman & Mozerman
ATTORNEYS

United States Patent Office 3,458,770

Patented July 29, 1969

3,458,770

LIGHT INTEGRATING CIRCUIT WITH CURRENT PRODUCING PHOTOSENSITIVE CELL IN THE BRIDGE CIRCUIT

George P. Denger, Spring City, Pa., assignor to Automatic Timing & Controls, Inc., King of Prussia, Pa., a corporation of Pennsylvania Filed June 14, 1966, Ser. No. 557,566
Int. Cl. H01h *47/14*
U.S. Cl. 317—140 10 Claims

ABSTRACT OF THE DISCLOSURE

This light-integrating circuit includes a bridge circuit, one aim of which has a photosensitive element placed to receive light to be metered. Upon exposure of the element to light current flows into an integrating circuit timing capacitor. An operational amplifier is coupled between the input bridge circuit and the input to the timing capacitor to keep the current into the capacitor proportional to the voltage at the bridge output.

This invention relates to apparatus which performs certain switching operations when a predetermined amount of light falls on a given surface.

There are a number of industrial applications in which it is desired to expose a photosensitive surface to a predetermined amount of light (which means herein visible and invisible electromagnetic radiation). The light integrating switch apparatus to be described herein may be used in connection with apparatus for exposing a photosensitive material such as film in a lightproof chamber, for example. Provision is made for locating at least a light transducer associated with the light integrator within that chamber so that some of the light emitted from the light source falls upon it as well as upon the photosensitive paper or emulsion. Depending on the setting of the integrator, it will, after the desired amount of light has been detected, turn the light source off or actuate any other switch.

It is among the objects of the present invention to provide an accurate light integrating switching circuit.

Another object is to provide an inexpensive light-integrating switching circuit.

Still another object is to provide a light-integrating switching circuit which automatically compensates for variations in input voltages occurring between timing cycles.
switching circuit which compensates for the characteristics of its light transducer.

Still other objects of the invention will occur to those skilled in the art upon perusal of the single figure and specification herein.

In accordance with the invention, there is provided a light-integrating switching apparatus which includes a photosensitive element in a bridge circuit. Upon exposure of this element to light, current flows into an integrating circuit until the latter is charged at which time a relay is actuated. The relay makes or breaks the desired load contacts and also actuates a bleed-off circuit for discharging the integrating capacitor before the next cycle of operation. In the form of the invention illustrated, an operational amplifier is provided which tends to maintain the current applied to said integrating circuit proportional to the current generated by the photosensitive element due to the incidence of light thereon.

Referring to the sole figure, there are shown two voltage input terminals 1 and 3 which may be connected to, for example, the output of a conventional power supply that is connected to an ordinary domestic or commercial line. The terminal 1 may be connected to a point on the power supply furnishing +25 volts DC, for example, whereas the terminal 3 may be connected to another point at −15 volts DC. A photocell 14, which is to be exposed to some of the radiation from the source which produces the radiation that falls upon the photosensitive surface, is connected in a bridge circuit with resistors 2, 4, potentiometer 6 and resistor 16. Thus, the photocell 14 is in one branch of the bridge opposite the series combination of resistor 4 and the portion of potentiometer 6 between its wiper and the junction of resistors 4 and 6. The potentiometer 6 is actually a zero-adjust device whose wiper is connected to ground and to the emitter of transistor TR2. The resistors 2, 4, 6, 8, 10 and 12 may also constitute a voltage dividing network for the output of the power supply.

At the junction of photocell 14 and resistor 16, due in large part to the operation of resistor 16 in converting the non-linear output of the photocell to a linear output, the voltage is linear with respect to the light falling on photocell 14.

The voltage at the junction of the wiper of potentiometer 6 and the emitter of transistor TR1 tends to remain constant since the transistor TR1 draws varying current depending upon variations in the line voltage or at terminals 1 and 3. The current at the junction of photocell 14 and resistor 16 is applied, via the settable dial potentiometer 22, to the principal integrating component, i.e. condenser 32 which has a large capacitance value.

Connected to the wiper of the potentiometer 6 is an operational amplifier comprising the transistors TR2, TR3 and TR5 together with their linking circuitry such as current-limiting resistors 24 and 26. The capacitor 38 and the resistor 36, as well as resistors 24 and 26, are inserted in the operational amplifier to give high frequency stability by preventing oscillation. This amplifier has a very high input impedance so as not to load down the photocell output. Transistor TR2 will turn on in the presence of a very small amount of current from the potentiometer 22 which is also connected to the timing or integrating capacitor 32. When TR2 turns on, TR3 does likewise which, in turn, turns transistor TR5 on.

As the current is applied to capacitor, 32 the voltage at its junction with diode 30 goes more and more negative. This is reflected back, via capacitor 32 to the base of TR2 tending to decrease its conductivity. This negative feed back signal tends to keep a minimal amount of current fed into the base of transistor TR2 thus enabling most of the current from potentiometer 22 to go to the timing capacitor 32. Due to the operational amplifier, the current into the integrating capacitor is kept proportional to the varying voltage at the junction of resistors 16 and 20. In this way, the capacitor 32 is enabled to perform accurately as the integrator of a signal which is the analog of the incident light.

As capacitor 32 is charging, its junction with the switch 44 goes more negative. As this junction goes more negative, so does the base of transistor TR4. The emitter of transistor TR4 is biased by its setting on the "trip point" potentiometer 10 which is in series with resistors 8 and 12 as well as with resistors 2, 4, and 6 of the bridge. When the voltage on the base of TR4 is sufficiently negative with respect to the bias on its emitter, current flows in its emitter-collector circuit into the base of transistor TR6. This makes TR6 conduct drawing current through relay coil 50. This produces an electromagnetic field which simultaneously closes switch 44, opens switch 46, closes switch 54, and opens switch 56. Switches 54 and 56 are the load switches for connection to the light source or any other circuit by the user.

When switch 46 is opened, transistor TR4 nevertheless remains conductive because current still continues to flow in its emitter-base circuit, in resistor 48 and in resistor 52. Thus, it will still keep TR6 conductive and coil 50 energized.

When coil 50 closes the switch 44, the charge on timing capacitor 32 is bled-off preparatory to initiation of the next timing cycle.

Resistors 20 and 40 are current limiting resistors. Resistor 18 limits the power dissipation of TR1. Capacitor 28 is a smoothing capacitor which prevents the relay 50 from tripping immediately upon application of power to the circuit. Resistor 42 is inserted to help keep transistor TR6 off. Resistor 34 is a current limiting resistor which determines, with capacitor 32 the rate at which the charge thereupon is bled-off. Resistor 31 is the load resistor for the operational amplifier. Resistor 48 is a limiting resistor controlling the amount of current into the base of TR4.

Diode 30 makes sure that capacitor 32 does not charge in the wrong polarity. Diode 51 is a transient suppressor for the relay 50. It prevents damage to the transistor TR6 when the field around the coil 50 collapses.

The following values of various components in the circuit illustrated in the single figure have worked quite satisfactorily but are not intended to be limiting, rather they are merely illustrative:

| | | |
|---|---|---|
| Resistor **2** | ohms | 390 |
| Resistor **4** | do | 100 |
| Potentiometer **6** | do | 50 |
| Resistor **8** | do | 150 |
| Potentiometer **10** | do | 100 |
| Resistor **12** | do | 120 |
| Photocell **14** | | Model PHC 4404 |
| Resistor **16** | ohms | 470 |
| TR**1** | | 2N3638 |
| Resistor **18** | ohms | 820 |
| Resistor **20** | do | 27,000 |
| Potentiometer **22** | megohm | 1 |
| TR**2** | | 2N930 |
| Resistor **24** | ohms | 330 |
| TR**3** | | 2N3638A |
| Resistor **26** | ohms | 2200 |
| Capacitor **28** | mfd | 10 |
| Transistor TR**4** | | 2N404 |
| Diode **30** | | 1N456 |
| Capacitor **32** | mfd | 180 |
| Resistor **34** | ohms | 10 |
| Resistor **36** | do | 1,000 |
| Capacitor **38** | mfd | .01 |
| Resistor **40** | ohms | 1,800 |
| Resistor **42** | do | 47,000 |
| Resistor **31** | do | 6800 |
| TR**5** | | 2N3394 |
| Diode **51** | | 1N461 |
| Resistor **48** | ohms | 3300 |
| TR**6** | | 2N3416 |
| Resistor **52** | ohms | 5600 |

As many variations which do not depart from the essence of this invention will occur to one skilled in the art upon perusing the above specification and drawing, it is desired that this invention be limited solely by reference to the following claims.

I claim:

1. A light-integrating switching circuit comprising:

(a) means including a photosensitive element for producing an output current in response to light falling upon said element, (b) an integrating circuit, (c) means for applying the preponderance of said output current to said integrating circuit, (d) means coupled to said applying means and to said integrating circuit which tends to maintain the current applied to said integrating circuit proportional to the output of said photosensitive element, and (c) means including switch means coupled to the output of said (d) means and to said integrating circuit, said switching means being responsive to the application of a predetermined amount of said current to said integrating circuit by said applying means.

2. The circuit according to claim 1 wherein said (d) means includes a negative feed back amplifier.

3. The circuit according to claim 1 wherein said (a) means comprises a bridge in one of whose arms said photosensitive element is disposed.

4. The circuit according to claim 3 wherein said applying means is adjustable to control the current flow therethrough into said integrating means.

5. The circuit according to claim 3 wherein said (b) means includes a capacitor, wherein (c) means includes an adjustable resistance for controlling the current flow into said integrating means, and wherein said (d) means comprises an operational amplifier having a negative feedback circuit which includes said capacitor.

6. The circuit according to claim 5 with the addition of additional amplifying means coupled to said capacitor and to said bridge, a winding in circuit with said additional amplifying means and at least one set of contacts adapted to change condition in response to energization or deenergization of said winding.

7. The circuit according to claim 6 with the addition of means for latching said additional amplifying means on energization of said winding.

8. The circuit according to claim 1 with the addition of means responsive to said (e) means for inactivating said integrating circuit after said predetermined amount of said current has been applied thereto.

9. The circuit according to claim 5 which also includes means responsive to said switching means for discharging said capacitor when said predetermined amount of current has been applied thereto.

10. The circuit according to claim 1 wherein said (d) means includes an operational amplifier.

References Cited

UNITED STATES PATENTS

| | | | |
|---|---|---|---|
| 2,944,190 | 7/1960 | Ost | 250—210 X |
| 3,056,332 | 10/1962 | Beregowitz | 317—130 X |
| 3,295,424 | 1/1967 | Biber | 307—311 X |
| 3,324,779 | 6/1967 | Nobusawa et al. | 307—311 X |
| 3,347,141 | 10/1967 | Nobusawa et al. | 317—130 X |

JAMES W. LAWRENCE, Primary Examiner

C. R. CAMPBELL, Assistant Examiner

U.S. Cl. X.R.

250—206, 210, 214; 307—311; 315—158, 159; 317—148.5